UNITED STATES PATENT OFFICE.

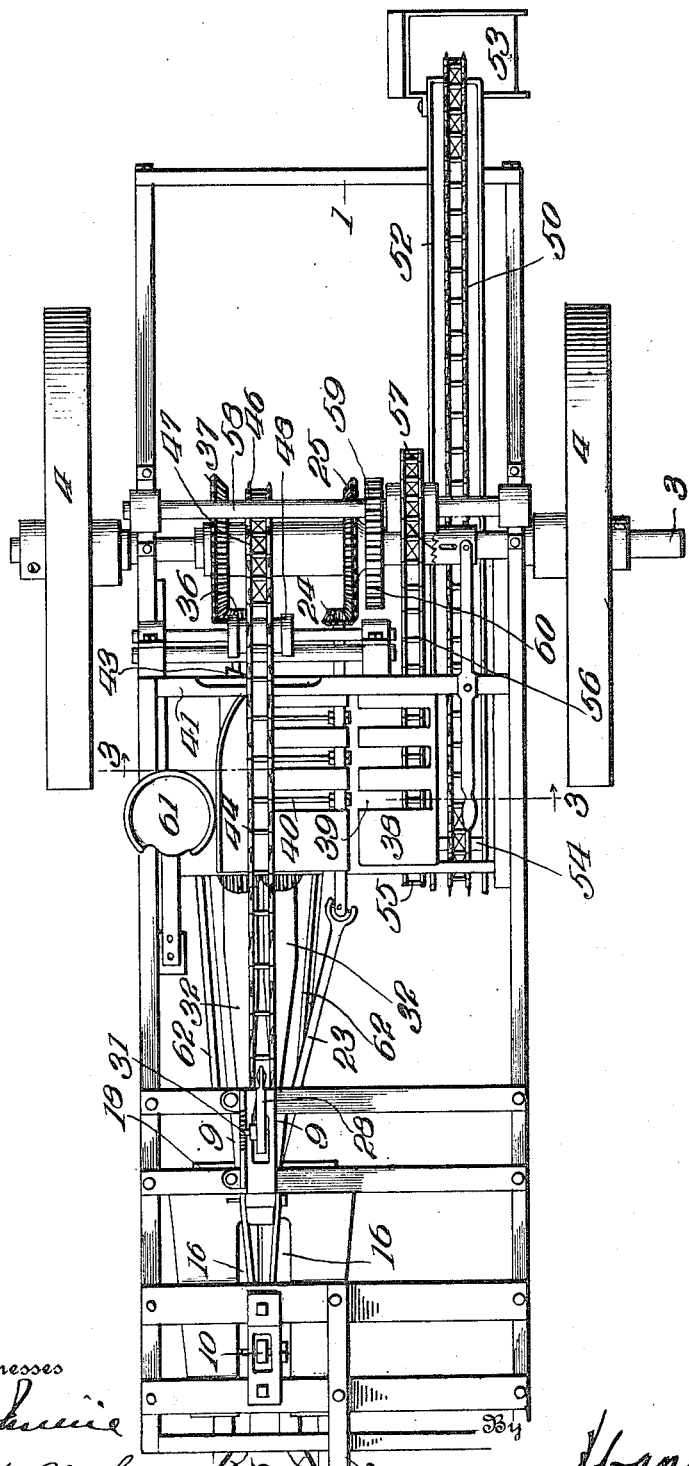

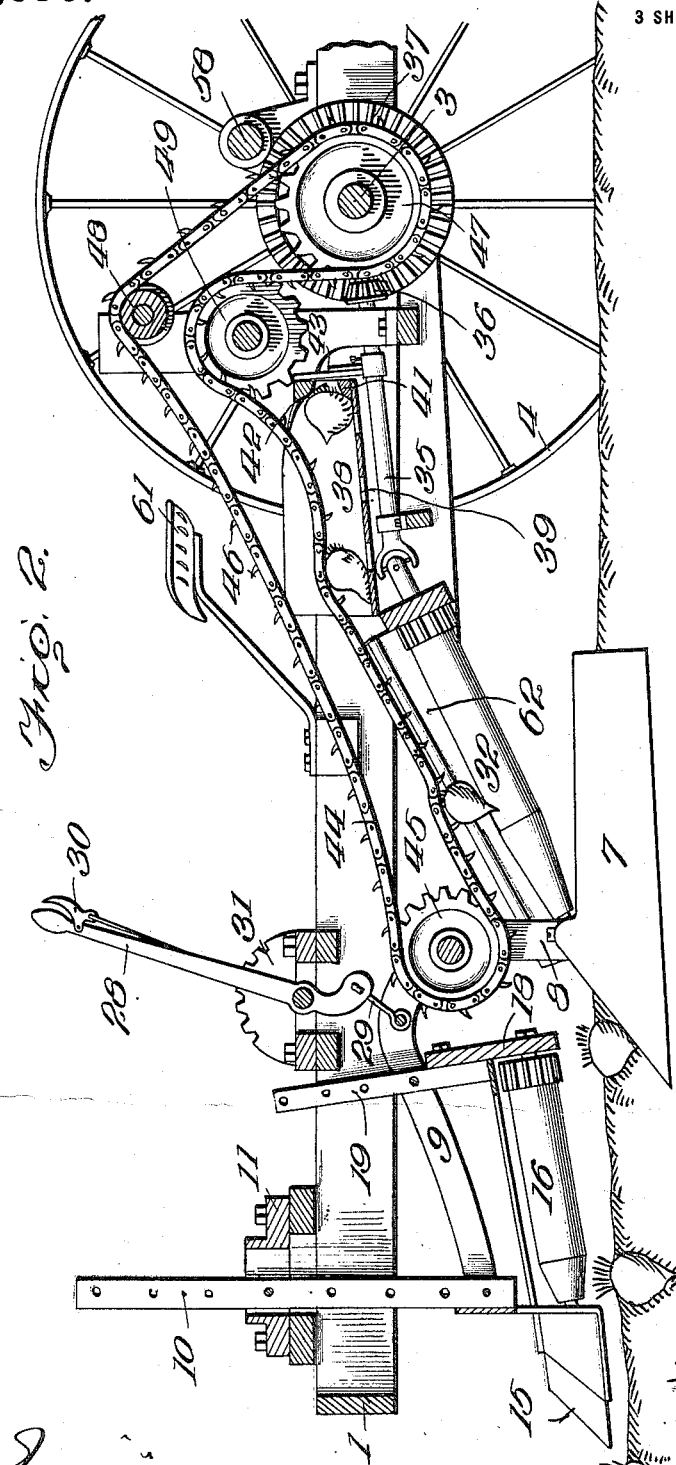

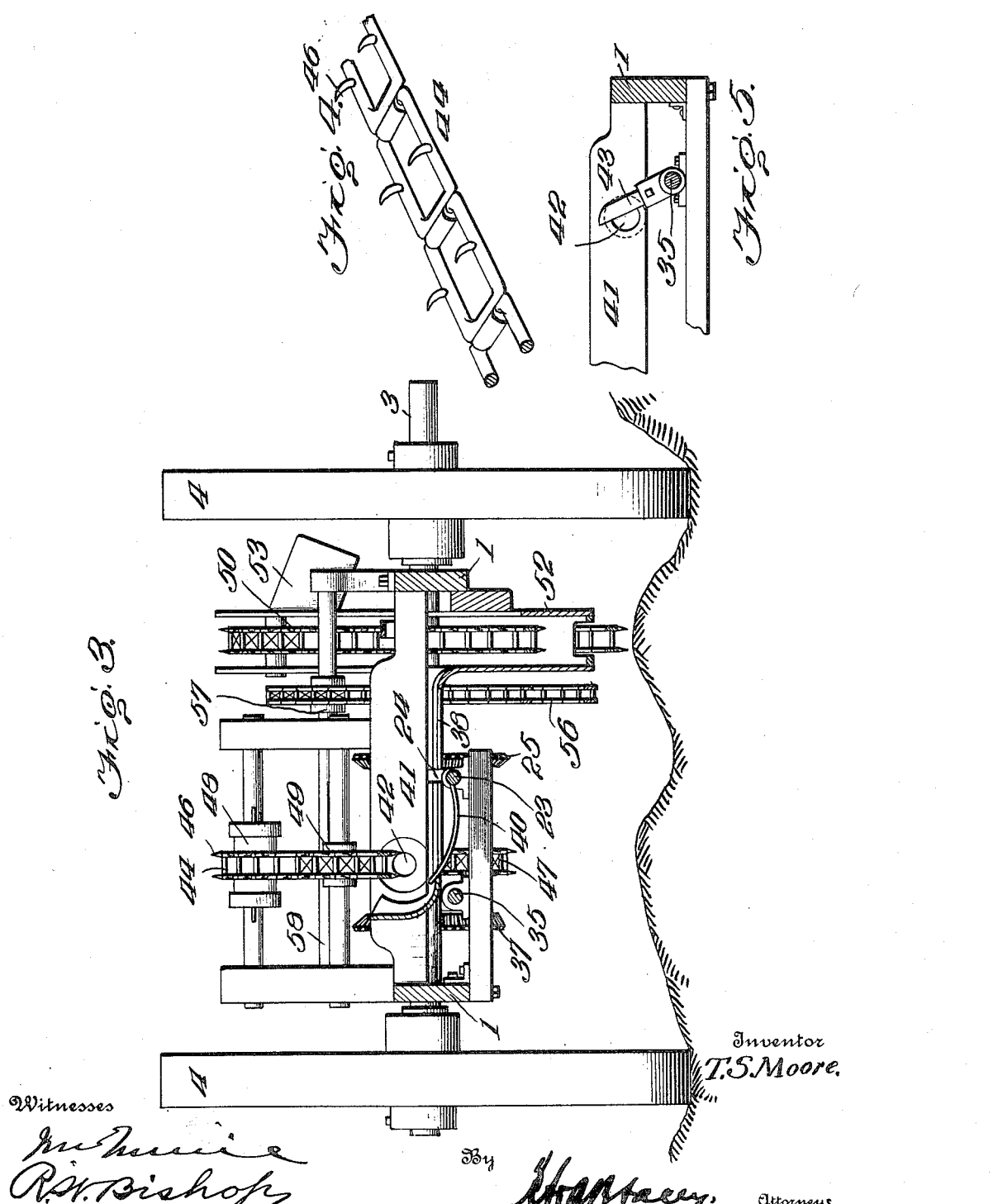

THOMAS S. MOORE, OF SHOSHONI, WYOMING, ASSIGNOR OF ONE-HALF TO MORT WILLIAMS, OF WHEATLAND, WYOMING.

GATHERING AND DISCHARGING MECHANISM FOR BEET-HARVESTERS.

1,142,050. Specification of Letters Patent. Patented June 8, 1915.

Original application filed October 11, 1913, Serial No. 794,684. Divided and this application filed February 25, 1914. Serial No. 820,942.

*To all whom it may concern:*

Be it known that I, THOMAS S. MOORE, citizen of the United States, residing at Shoshoni, in the county of Fremont and State of Wyoming, have invented certain new and useful Improvements in Gathering and Discharging Mechanism for Beet-Harvesters, of which the following is a specification.

This application is a division of an application filed by me October 11, 1913, Serial No. 794,684.

The invention relates to beet harvesters and has special reference to the mechanism for conveying the beets from the uprooting mechanism to the rear of the machine, the object being to provide simple and efficient means for conveying the beets from the uprooting mechanism to the point of delivery, and also to remove from the beets, as they pass to the point of delivery, any tops which may remain thereon.

The preferred embodiment of my present invention is illustrated in the accompanying drawings in which—

Figure 1 is a plan view of a beet harvester equipped with my improvements; Fig. 2 is a vertical longitudinal section; Fig. 3 is a transverse vertical section on the line 3—3 of Fig. 1; Fig. 4 is a detail perspective view of a portion of the conveyer chain; Fig. 5 is a detail view of the cutter.

In carrying out my invention, I employ a frame 1 which may be of any convenient dimensions and of any preferred detailed construction. This frame is equipped at its front end with a draft pole or tongue 2 and in the sides of the frame is journaled an axle 3 upon which are fitted ground wheels 4 adapted to actuate the axle through the well known escapement devices.

The plows 7, which are designed to run in the ground along the row of plants and at opposite sides of the plants in the row, are secured to and carried by the lower ends of standards 8 which have their upper ends merged into forwardly extending beams 9 and the said beams are secured at their front ends to a hanger 10 which is adjustably suspended in a bracket 11 secured upon the frame 1 of the machine. The front ends of the beams may thus be adjusted to any desired height and the depth at which the working parts may travel thus regulated. Carried by the lower ends of the hanger 10 and a hanger 19 rising between the plow beams 9 and adjustably secured thereto, are deflectors 15 and a pair of topping rollers 16. Motion is imparted to the topping rollers 16 through intermeshing pinions on the rollers and a flexible shaft 23 which has its front end secured to the rear end of one of the rollers, the rear end of the said shaft being equipped with a pinion 24 which meshes with a gear wheel 25 fitted loosely upon the axle and has its hub elongated at one side and constructed with a ratchet or clutch face, as shown most clearly in Fig. 1. A coacting clutch member is splined upon and shiftable longitudinally of the axle. When the clutch members are disengaged, the machine may travel without actuating the working mechanism and when it is desired to act upon the plants it is necessary only to bring the clutch members into engagement, whereupon the gear wheel will be actuated.

The plows 7 will, of course, run directly behind the topping rollers 16 and they are set to take into the ground to any desired depth by manipulating a lever 28 which is fulcrumed upon the frame above the rear ends of the plow beams 9 and is connected with said beams by a link 29, as shown. This lever is equipped with the usual latch or holding member 30 adapted to engage a segment or rack 31 so that the plows will be held in the position in which they may be set. Above the plows 7, and extending upwardly and rearwardly from the standards 8, are a pair of rollers 32 which are adapted to coöperate with the plows in raising the beet bodies and are so mounted that they may readily accommodate the vertical movement or adjustment of the plows. The rollers 32 are equipped with intermeshing pinions and one of them has secured to its rear end the front end of a flexible shaft 35 which is journaled in suitable bearings upon the frame of the machine and is fitted at its rear end with a pinion 36 meshing with a gear wheel 37. The said gear wheel 37 is formed upon or secured rigidly to an extension of the hub of the gear wheel 25 so that the said gear wheels 25 and 37 will operate simultaneously. A platform 38 is secured upon the frame of the machine over the rear portions of the shafts 23 and 35 and the said platform is constructed with slots 39 through which may operate fingers 40, carried by the shaft 23, to push the beets delivered onto the platform onto the elevator. At the rear of the said platform is a stop 41 having an opening 42 therein to which the beets will be guided and through which any tops that may be left on the beets will be projected. Upon the shaft 35 immediately in rear of the said stop 41 is a knife 43 which, by the rotation of the said shaft, will be drawn against the tops projecting through the opening 42 and sever the said tops, so that the beet bodies delivered to the elevator will be free of all leaves and stems.

Disposed longitudinally of the machine and above the rollers 32 so as to coöperate therewith is a flexible carrier or chain 44 which is trained around a sprocket 45 journaled upon the plow standards 8 and provided with pairs of teeth or pins 46 upon each of its links. The said chain is actuated by a sprocket wheel 47, secured upon the extended hub of the gear wheels 25 and 37 and between the said gear wheels, and the intermediate portions of its upper and lower runs are supported and guided by idlers 48 and 49 mounted in any convenient manner upon the frame of the machine above and in rear of the platform 38. As the beet bodies are taken up by the rollers 32, the pins or teeth 46 of the carrier 44 will engage the bodies and force them toward and over the rear ends of the rollers and onto the platform 38 to and against the stop 42 which will arrest the travel of the beets and cause the carrier to release the same.

The elevator 50 is disposed at one side of the machine and consists of a chain similar in its construction to the carrier 44 and running in a trough or trunk 52 which is secured upon the frame, as shown clearly in Figs. 1 and 3, so that the lower end of the elevator will be below the platform 38 in position to receive the beet bodies therefrom, while the upper end of the elevator will be above the rear end of the machine in position to deliver the beets into any convenient receptacle at that point. In actual practice, I prefer to equip the upper rear end of the elevator with a spout or chute 53 by which the beets will be directed into a wagon drawn over the field in rear of the beet harvester. The chain 50 will, of course, be trained around sprocket wheels at the upper and lower ends of the trunk or trough 52 and the shaft 54 of the lower sprocket wheel is extended through and slightly beyond the inner side of the trunk and equipped with a second sprocket wheel or pinion 55 around which is trained a driving chain 56 which is actuated by a sprocket wheel 57 secured upon a counter-shaft 58 mounted in suitable bearings upon the frame in rear of and slightly above the axle and equipped with a pinion 59 which meshes with a gear wheel 60 on the extended hub of the gear wheel 25. It will be noted that the gear wheels 25, 37, and 60 and the sprocket wheel 47 have a common hub or connecting sleeve, so that the said wheels will operate simultaneously or will all remain at rest, accordingly as the clutch member 27 is caused to engage the clutch member 26 or is held out of engagement therewith.

It is thought the operation of my improved machine will be readily understood from the foregoing description taken in connection with the accompanying drawings. As the machine is drawn along the row of plants the deflectors 15 will pass under and raise the drooping leaves and stems growing from the tops of the beet bodies or roots and the topping rollers 16 which are immediately in rear of the said deflectors will pass at opposite sides of the bunched tops and pull the same from the plants. The continued forward travel of the machine will then bring the plows 7 under the beets and at opposite sides of the same, so that the beets will be caused to ride up the front inclined edges or points of the plows to the front ends of the rollers 32 which will engage the beets as they pass over the upper ends of the plows, and will impart an upward movement to the beets so that they may be engaged by the pins of the carrier 44. The said carrier will then force the beets onto the platform 38, as previously stated, from which they will be pushed laterally by the fingers 40, as will be readily understood, and pass onto the elevator 50. The rollers and the carrier are all driven positively from the gearing mounted on the axle of the machine, so that the beets cannot accumulate at any one point and clog the operation. The dirt which may adhere to a beet as it is uprooted by the plows will drop therefrom as it travels over the rollers 32 and as it is delivered onto the platform 38 and will fall through the space between the rollers and through the slots in the platform.

What I claim is:—

1. A beet harvester comprising a frame, uprooting members mounted on the frame at one side thereof, an elevator mounted on the frame at the opposite side thereof, a platform on the frame at one side of the elevator and in rear of the uprooting mechanism, means for delivering the beets from the uprooting members onto the platform, and means for pushing the beets over the platform transversely of the frame onto the elevator.

2. In a beet harvester, the combination of a main frame, a platform secured thereon and provided with slots disposed transversely of the main frame, an elevator mounted upon the main frame at one side of said platform, beet uprooting members disposed in advance of the platform, a carrier coöperating with the said beet uprooting members to deliver beets onto the platform, a shaft disposed below the platform, fingers carried by said shaft and playing through the slots in the platform to move the beets therefrom onto the elevator, and means for rotating said shaft.

3. In a beet harvester, the combination of a main frame, a platform secured thereon and provided with slots disposed transversely of the main frame, means for delivering beets upon said platform, and rotating fingers playing through the slots in the platform to move the beets laterally thereover.

In testimony whereof I affix my signature in presence of two witnesses.

THOMAS S. MOORE. [L. S.]

Witnesses:
ANTHONY HANSON,
RALPH S. LINN.